United States Patent

Nishi et al.

[11] Patent Number: 5,929,961
[45] Date of Patent: Jul. 27, 1999

[54] METHOD AND SYSTEM FOR FABRICATING LIQUID CRYSTAL CELLS HAVING WINDING MEANS

[75] Inventors: Takeshi Nishi; Satoshi Teramoto, both of Kanagawa, Japan

[73] Assignee: Semiconductor Energy Laboratory Co. Ltd., Kanagawa-ken, Japan

[21] Appl. No.: 08/566,143

[22] Filed: Dec. 1, 1995

[30] Foreign Application Priority Data

Jan. 11, 1995 [JP] Japan ................................. 7-018713

[51] Int. Cl.⁶ .......................... G02F 1/1345; G02F 1/13; G02F 1/1339
[52] U.S. Cl. ......................... 349/187; 349/150; 349/190
[58] Field of Search .................... 349/150, 187, 349/190

[56] References Cited

U.S. PATENT DOCUMENTS

| | | | |
|---|---|---|---|
| 5,238,523 | 8/1993 | Yuasa et al. | 349/187 |
| 5,358,810 | 10/1994 | Yoshino | 349/106 |
| 5,558,732 | 9/1996 | Hamon | 349/187 |
| 5,568,292 | 10/1996 | Kim | 349/106 |
| 5,657,408 | 8/1997 | Ferm et al. | 349/57 |
| 5,672,296 | 9/1997 | Shen et al. | 349/96 |
| 5,682,218 | 10/1997 | Shimizu et al. | 349/86 |

FOREIGN PATENT DOCUMENTS

| | | | |
|---|---|---|---|
| 56-048612 | 5/1981 | Japan | 349/187 |
| 62-150218 | 7/1987 | Japan | 349/190 |
| 4-347819 | 12/1992 | Japan | 349/187 |
| 6-273617 | 9/1994 | Japan . | |
| 7-333595 | 12/1995 | Japan . | |

Primary Examiner—William L. Sikes
Assistant Examiner—Toan Ton
Attorney, Agent, or Firm—Sixbey, Friedman, Leedom & Ferguson, PC; Eric J. Robinson

[57] ABSTRACT

Techniques for successively fabricating liquid crystal cells at low cost, using two resinous substrates wound on their respective rolls. A color filter and an electrode pattern are formed by printing techniques. Furthermore, an orientation film is printed. These manufacturing steps are carried out successively by rotating various rolls.

14 Claims, 1 Drawing Sheet

METHOD AND SYSTEM FOR FABRICATING LIQUID CRYSTAL CELLS HAVING WINDING MEANS

BACKGROUND OF THE INVENTION

1. Field of the Invention

The present invention relates to a method of fabricating liquid-crystal electrooptical devices using flexible film substrates and also to a system for fabricating such liquid-crystal electrooptical devices using flexible film substrates.

2. Description of the Related Art

A liquid-crystal electrooptical device is known as a thin, small-sized, lightweight display device. The liquid-crystal electrooptical device comprises a pair of substrates spaced several micrometers from each other and a liquid crystal material held between the substrates. The substrates are required to transmit visible light and so glass substrates are generally used as the substrates. The glass substrates have the required optical characteristics. In addition, they are inexpensive.

The liquid-crystal electrooptical device must meet the following technical requirements: (1) It is small in size and lightweight; and (2) the cost of fabricating the liquid-crystal electrooptical device is reduced and its productivity is improved.

Of these requirements, the requirement (1) is that the liquid-crystal electrooptical device is made thinner and lighter in weight. A known configuration which satisfies these requirements uses resinous substrates (generally known also as plastic substrates) transmitting light.

Where resinous substrates are employed, reductions in size and weight can be accomplished. Since the substrates themselves have flexibility, a physical stress can be applied to them, or they can be used in a curved state. These kinds of usage can further extend the application of the liquid-crystal electro-optical device.

However, where resinous substrates are used, a reduction in fabrication cost and an improvement in the productivity are not accomplished.

SUMMARY OF THE INVENTION

It is an object of the present invention to provide techniques for fabricating liquid-crystal electrooptical devices, using flexible substrates, at low cost and with high productivity.

A system for fabricating liquid crystal cells according to the present invention comprises a first roll on which a first flexible substrate has been wound, a second roll on which a second flexible substrate has been wound, means for forming a liquid crystal material layer on the surface of the first substrate, and means for bonding together the first and second substrates 206,201.

A specific example of the structure of the above-described system is shown in FIG. 1, where a first flexible substrate 206 has been wound on a first roll 119. A second flexible substrate 201 has been wound on a second roll 101. A dripping device 135 acts to drip a liquid crystal material onto the surface of the first substrate 206. A set of rolls, 137 and 138, is the means for bonding together the first and second substrates 206,201.

The flexible substrates can be made from PET (polyethylene terephthalate), PEN (polyethylene naphthalate), PES (poly-ethylene sulfite), polyimide, or PAR (polyarylate).

A method of fabricating liquid crystal cells according to the present invention consists of preparing a first flexible substrate wound on a first roll, preparing a second flexible substrate wound on a second roll, and squeezing a liquid crystal material between the first and second substrates to form an elongated liquid crystal cell.

Another method of fabricating liquid crystal cells according to the present invention consists of winding a flexible substrate on a roll, printing an orientation film on the substrate, orienting molecules of the orientation film, spraying spacers on the orientation film, and printing a sealing material. These manufacturing steps are effected successively.

A specific example of the above-described method is illustrated in FIG. 1. An orientation film 209 is formed on the flexible substrate 206 by rolls 127 and 128, the substrate 206 being wound on the roll 119. Spacers 211 are sprayed. A sealing material (not shown) is printed.

Other objects and features of the invention will appear in the course of the description thereof, which follows.

DETAILED DESCRIPTION OF THE PREFERRED EMBODIMENT

Figure 1:
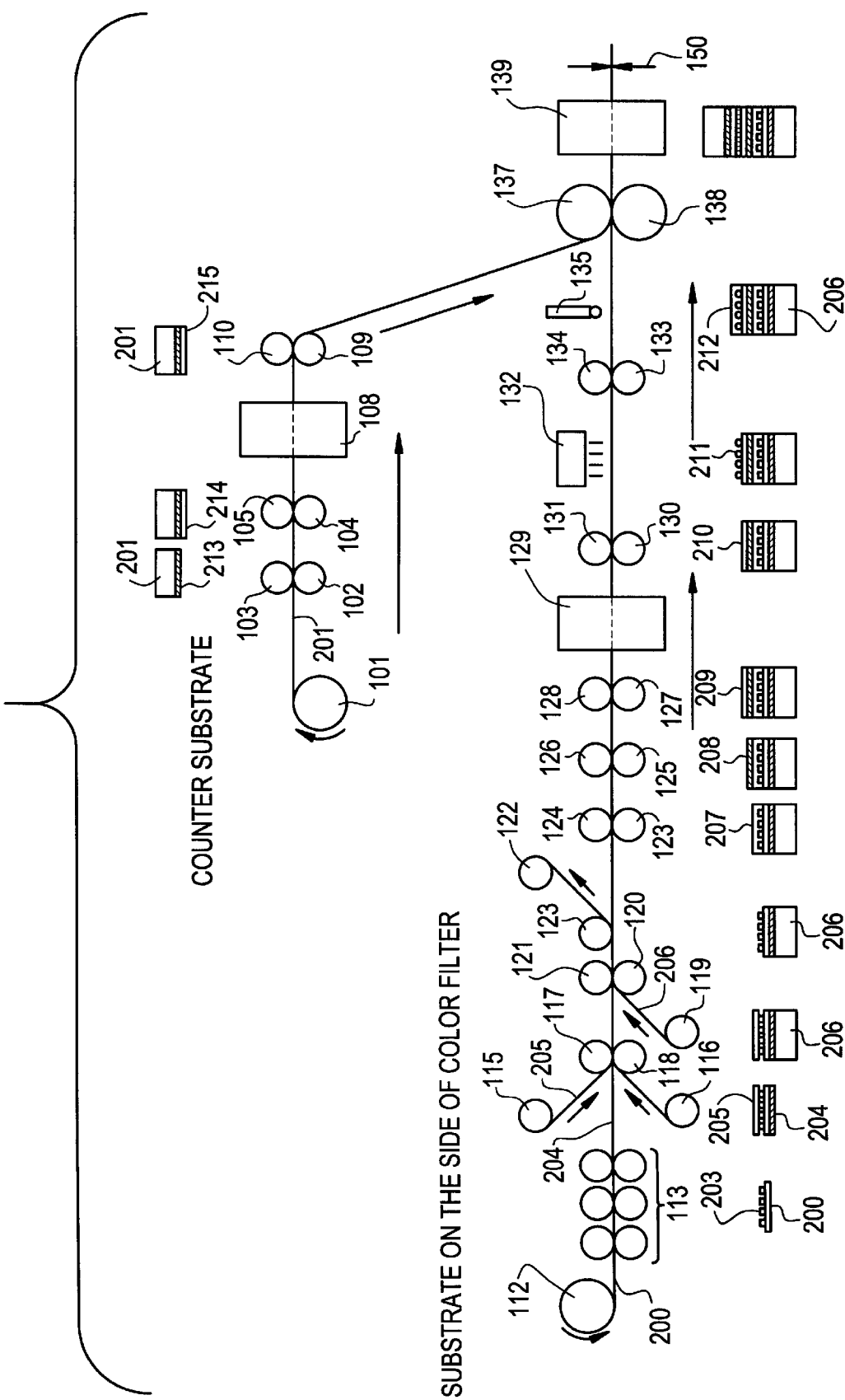
FIG. 1 is a schematic diagram of a system for fabricating liquid-crystal electrooptical devices according to the present invention.

The present example is a production system capable of producing liquid-crystal electrooptical devices in succession, each electrooptical device using flexible resinous substrates. This fabrication system is schematically shown in FIG. 1 and intended to produce the flexible resinous substrates wound on rolls 101 and 119, for constructing each liquid-crystal electrooptical device.

First, a manufacturing step regarding resinous substrates wound around the roll 119 is described. In this example, resinous substrate coiled around the roll 119 consist of film of PET (polyethylene terephthalate). A three-colored (R, G, and B) filter 203 is printed on the surface of the RET film 200 drawn out of the roll 112. This PET film acts as a base in forming the color filter 203. The color filter 203 is formed by means of three sets of rolls 113. Where the manufactured liquid crystal display is a monochrome display, these three sets of rolls are not necessary.

After forming the color filter 203, a protective film 205 wound on a roll 115 is formed so as to cover the color filter 203 previously formed. A self-adhesive film 204 wound on a roll 116 is stuck on the rear side of the base, i.e., on the opposite side of the surface on which the colored filter is formed. This series of manufacturing steps is performed, using a pair of pressure rolls, 117 and 118.

Then, another PET film 206 which is wound on the roll 119 and forms a base is stuck via the self-adhesive film 204 by means of a set of pressure rolls, 120 and 121. Subsequently, the protective film 205 is peeled off by a roll 123 and wound on a roll 122.

Thereafter, an overcoat film 207 is printed by a set of rolls, 123 and 124, to flatten the irregularities created by the formation of the color filter 203. This overcoat film 207 is made from a resinous material transparent to light.

A required electrode pattern 208 is printed, using a set of rolls, 125 and 126. The electrode pattern 208 is made from a conductive ink.

Then, an orientation film 209 is printed by the use of a set of rolls, 127 and 128. The orientation film 209 is passed through a heating furnace 129 to bake it. As a result, a solidified orientation film 210 is obtained.

The orientation film 210 is passed between rolls 130 and 131 to rub the surfaces of the orientation film 210. In this way, the molecules of the film are oriented. Then, spacers are sprayed from a spacer dispenser 132 to place the spacers 211 on the oriented film 210.

Thereafter, a sealing material (not shown) is printed to bond together opposite substrates and to prevent the liquid crystal material from leaking from the spacing between the substrates.

Subsequently, the liquid crystal material is dripped, using the liquid crystal material-dripping device 135, to form a liquid crystal material layer 212. In this manner, one substrate is completed. The manufacturing steps described thus far are successively carried out by rotating the various rolls.

The other substrate is manufactured in the manner described below. A desired electrode pattern 213 is formed on the PET film 201 drawn out of the roll 101 by a pair of rolls 102 and 103. Then, an orientation film 214 is printed through the use of a pair of rolls 104 and 105. The film is baked by a heating furnace 108, so that a solidified orientation film 215 is formed. Thereafter, the substrate is passed between a pair of rolls 109 and 110 and guided to the rolls 137 and 138 to form a cell.

The liquid crystal cell is formed on the PET film pair by the steps described thus far. This PET film pair is passed between a pair of rolls 137 and 138 to bond together the films, using a sealing material.

Then, heating is done within a heating furnace 139 to cure the sealing material, thus completing bonding of the substrates. The resulting substrate assembly is cut into desired size with a cutter 150. In this way, a liquid crystal cell is completed.

The manufacturing steps described thus far are performed in succession by rotating the various rolls. By cutting the substrate assembly with the cutter 150, liquid crystal cells are successively fabricated.

In the present example, passive liquid crystal cells are manufactured. It is also possible to fabricate active liquid crystal cells by fabricating nonlinear devices and TFTs simultaneously by printing techniques.

In the present example, liquid crystal cells are formed on PET films which are industrially often used like magnetic tape. Besides PET, PEN (polyethylene naphthalate), PES (polyethylene sulfite), polyimide, and PAR (polyarylate) can be used.

Where PET or PES film is used, birefringence may take place, in which case the image displayed on the device may be adversely affected. On the other hand, neither PES film nor PAR film induces birefringence and they satisfy the optical characteristics which every display device must meet.

In the present invention, when flexible liquid crystal cells are manufactured, flexible substrates wound on rolls are used. Consequently, liquid crystal cells can be manufactured in succession.

What is claimed is:

1. A system for successively fabricating liquid crystal cells comprising:

first winding means for winding a first flexible substrate;

second winding means for winding a second flexible substrate;

first transferring means for transferring said first substrate drawn out of said first winding means in a first direction;

second transferring means for transferring said second substrate drawn out of said second winding means in a second direction;

third winding means for winding a base film;

means for forming color filters on said base film drawn out of said third winding means;

means for forming a protective film on said color filters;

means for forming an adhesive film on a rear side of said base film, means for sticking said first substrate to said base film via said adhesive film;

means for forming at least a liquid crystal material for said first substrate;

means for forming at least an electrode pattern for said second substrate;

means for bonding said first substrate and second substrate to form a substrate assembly, said liquid crystal material and said electrode pattern facing each other; and means for cutting said substrate assembly to form a plurality of liquid crystal cells.

2. The system of claim 1 wherein said protective film is wound by a fourth winding means and said adhesive film is wound by a fifth winding means, wherein said protective film and adhesive film are formed for said base film by a pair of pressure rolls.

3. The system of claim 1 further comprising:

means for peeling off and winding said protective film;

means for forming an overcoat film on said color filters to flatten a surface thereof.

4. The system of claim 1 comprising:

means for forming electrodes pattern over said first substrate;

means for forming an orientation film on said electrodes pattern;

means for heating said formed orientation film to obtain a solidified orientation film;

means for rubbing a surface of said solidified orientation film; and means for placing spacers on a surface of said rubbed orientation.

5. The system of claim 1 comprising:

means for forming a sealing material for said first substrate to bond with said second substrate, whereby said sealing material prevents said liquid crystal material from leaking from a spacing between said first and second substrates.

6. The system of claim 1 further comprising:

means for forming orientation film on said electrode pattern of said second substrate; and means for heating said formed orientation film to obtain a solidified orientation film.

7. A method of fabricating a liquid crystal cell comprising the steps of:

winding a first flexible substrate onto a first winding means;

winding a second flexible substrate onto a second winding means;

transferring said first flexible substrate drawn out of said first winding means in a first direction;

transferring said second flexible substrate drawn out of said second winding means in a second direction;

winding a base film onto a third winding means;

forming color filters on said base film drawn out of said third winding means;

forming a protective film on said color filters;

forming an adhesive film on a rear side of sid base film;

sticking said first substrate to said base film via said adhesive film;

forming at least a liquid crystal material over said first flexible substrate;

forming at least an electrode pattern over said second flexible substrate;

bonding said first flexible substrate and said second flexible substrate to form a substrate assembly, said liquid crystal material and said electrode pattern over said second flexible substrate facing each other;

cutting said substrate assembly to form a plurality of liquid crystal cells.

8. The method according to claim 7, wherein said protective film is wound by a fourth winding means and said adhesive film is wound by a fifth winding means, and wherein said protective film and adhesive film are formed on said base film by a pair of pressure rolls.

9. The method according to claim 7 further comprising the steps of:

peeling off said protective film from the first flexible substrate; and forming an overcoat film on said color filters.

10. The method according to claim 7 further comprising the steps of:

forming electrodes pattern over said first flexible substrate;

forming a first orientation film on said electrodes pattern over said first flexible substrate;

heating said first orientation film to solidify and first orientation film;

rubbing a surface of said first orientation film; and placing spacers on a surface of said first orientation film.

11. The method according to claim 7 further comprising the steps of:

forming a sealing material for said first flexible substrate to bond with said second flexible substrate,
whereby said liquid crystal material is prevents leaking from a spacing between said first flexible substrate and second flexible substrate.

12. The method according to claim 7 further comprising the steps of:

forming a second orientation film on said electrode pattern of said second flexible substrate; and heating said second orientation film to solidify said second orientation film.

13. The method according to claim 7, wherein said base film comprises polyethylene terephthalate.

14. The method according to claim 7, wherein said first and second flexible substrates comprise material selected from the group consisting of polyethylene terephthalate, polyethylene naphalate, polyethylene sulfite, polyimide, and polyarylate.

* * * * *